Jan. 24, 1956   D. S. BOLLEY ET AL   2,732,395
PROCESS FOR SEPARATION OF "PHYTIN" FROM SEEDS
Filed May 20, 1952
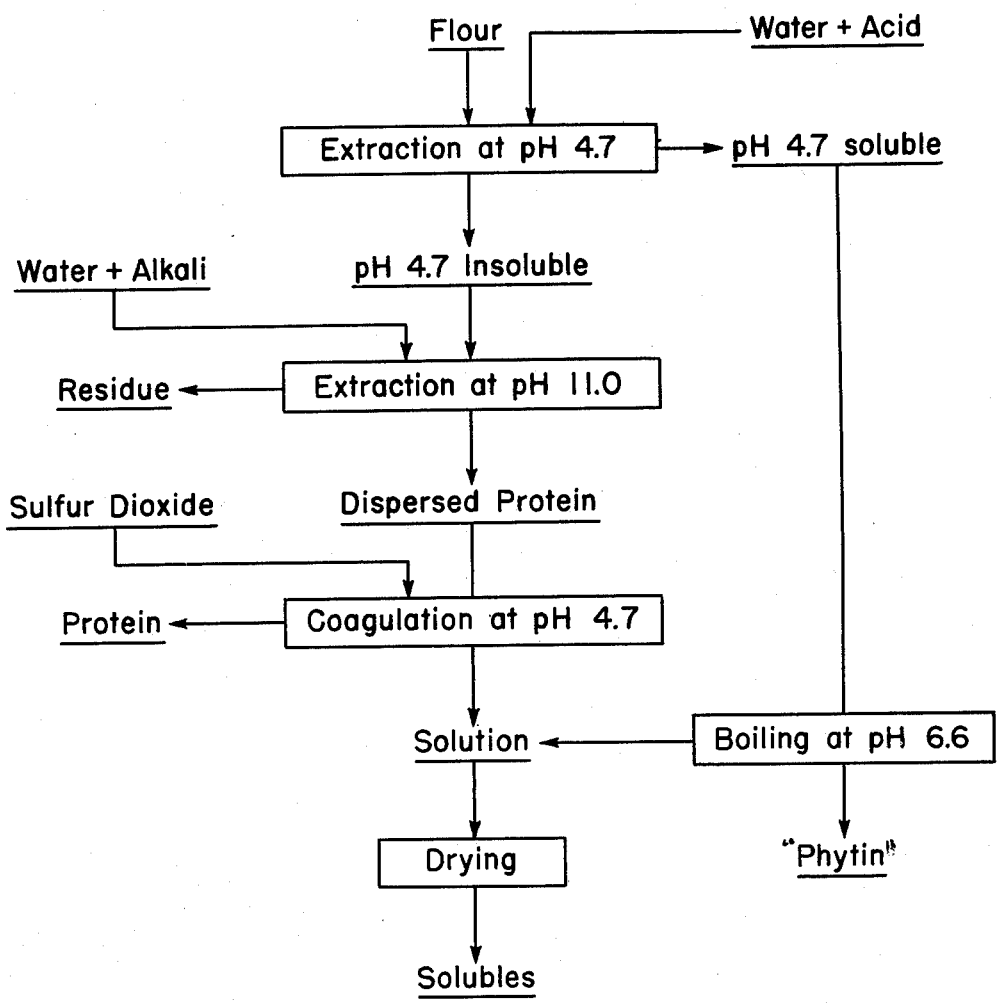
Preparation of Seed Products
Don S. Bolley,
Ralph H. McCormack, &
Frank C. Naughton
INVENTORS
BY W. R. Sprowls
AGENT

United States Patent Office 2,732,395
Patented Jan. 24, 1956

2,732,395

PROCESS FOR SEPARATION OF "PHYTIN" FROM SEEDS

Don S. Bolley, Watchung, N. J., Ralph H. McCormack, Detroit, Mich., and Frank C. Naughton, North Bergen, N. J., assignors to National Lead Company, New York, N. Y., a corporation of New Jersey Application May 20, 1952, Serial No. 288,938

5 Claims. (Cl. 260—461)

This invention relates to a method for the recovery of "phytin" from oil seeds. The method of this invention also enables the recovery of an improved chemically purified protein or protein isolate.

"Phytin" is a starting material for the preparation of inositol. Both "phytin" and inositol have great utility in the field of nutrition, and are also used as fermentation nutrients. Inositol is also of interest in the drying oil field, since esters having exceptional drying properties can be prepared from this polyhydric alcohol.

Prior to this invention, a satisfactory non-chemical method for the recovery of "phytin" from seeds was not commercially available. Thus, prior art methods required the use of calcium or iron bases or basic salts to effect the precipitation of "phytin" as the corresponding metal salt.

Heretofore, it has been customary to obtain vegetable proteins from seed flours by methods which consist essentially of dispersing the protein in an aqueous alkaline, acid or salt solution, separating the dispersed from the undispersed material, coagulating and precipitating the dispersed protein by adjusting the pH of the dispersion to the isoelectric point of the dispersed protein, and then separating the coagulated protein and drying it. The aqueous alkaline solution generally used to disperse the protein also dissolves the water-soluble constituents of the oil-free meal so that these constituents are present in solution after the protein dispersing operation. When the pH of the protein dispersion is adjusted to the isoelectric point of the protein, the water-soluble constituents, including "phytin," contaminate the precipitated protein due to occlusion. Methods available for the purification of the protein are not particularly successful and involve prolonged processing operations. The solutions resulting from such processing create storage and disposal problems, because of their ready fermentation and creation of pollution of streams and water supplies, respectively.

It is an object of the present invention to provide a method for separating "phytin" from dispersible proteins. Another object is the preparation of a substantially "phytin"-free protein fraction from seed protein flours. It is a further object of the invention to provide a non-chemical method for producing "phytin." Other objects will be apparent from the following description of the invention.

The present invention eliminates the chemical treatment heretofore required in the production and recovery of "phytin," and provides an improved method for the accomplishment of this object. The preferred method of this invention involves leaching an oil-free seed meal with acidulated water having a pH of or approximating that of the isoelectric point of the particular protein present in said meal, which pH is usually in the range from 4.5 to 4.9. At this pH, there is little tendency for the protein globulins in the meal to disperse. But, a soluble fraction is obtained in which the "phytin" is concentrated. The pH of this soluble fraction is then adjusted to between 6.4 and 7.0, and the neutral or nearly neutral solution is heated to an elevated temperature, preferably in the range from 80° C. to the boiling point of the solution, in order to effect coagulation and precipitation of the "phytin." While lower temperatures can be used for this coagulation and precipitation step, the times required at such lower temperatures are too long to be practical. The precipitate is separated by settling, filtering, or centrifuging, and, on drying, yields a "phytin" concentrate.

Following the initial leaching operation, the residual solids are extracted with an aqueous solution having a pH greater than about 8.0. The resulting dispersed protein is separated from the residue, and is coagulated by lowering the pH of the dispersion to or close to the isoelectric point of the protein, this pH usually being from 4.5 to 4.9. The resulting coagulated globulin is separated from the supernatant liquid by filtration or centrifugation. Drying of this coagulum results in the recovery of a purified protein, which is substantially free from organic phosphorus compounds, including "phytin," as well as other water-soluble seed meal constitutents.

Thus, in substance, this invention proceeds on the basis of separating "phytin" and other water-soluble constituents from the protein, prior to the dispersion of the latter material. Such a non-chemical operation has not been utilized in the prior art. Also, this invention has resulted in a method for separating "phytin" from the solution of water-soluble constituents of seed meals. Such a non-chemical method has not previously been available.

The method of this invention applies to substantially oil free, vegetable seed meals, and particularly to those meals obtained from flaxseed, soybeans, peanuts, stillingia, Chinese tallow tree seed, and the seeds of the gourds, *Cucurbita digitata, C. foetidissima* and *C. palmata*. A suitable technique for preparing the oil free seed meals involves grinding the seeds, and removing the oil therefrom by means of an aliphatic hydrocarbon solvent. The seed coats can be removed from the flour by screening and/or air separation to yield the high protein flour which is the starting point for our invention.

In the accompanying figure, the procedure for the preparation of the various products from oil free seed flours is indicated diagrammatically. The information presented in this figure is intended to present a preferred technique as regards pH values, treating agents, and the like, and thus is not intended as a limitation on our invention. The initial extraction is suitably effected by slurrying the seed flour with about 15 parts of water and sufficient acid to attain a pH of 4.5 to 4.9. Preferred acids for this purpose are hydrochloric or sulfurous acids. After a short period of agitation at room temperature, the slurry is filtered or centrifuged. As indicated in the figure, the resulting filtrate is brought to a pH of 6.4 to 7.0 with alkali, and boiled to produce a "phytin" precipitate. The treatment of the solids from the initial extraction step is also indicated in the figure, and is described above.

The protein contents of the several products resulting from the utilization of the process of this invention were determined by the Kjeldahl nitrogen method, the thus determined nitrogen content being multiplied by a factor of 6.25 to obtain the protein content. "Phytin" is a phosphorus-containing material, and an analysis can be made for "phytin" phosphorus by a method described by Young, J. Biol. Chem. 30, 257–7 (1936); the amount of "phytin" is then obtained by multiplying the "phytin" phosphorus by the factor 4.55. However, this analysis is effected with difficulty, and it is, in general, more satisfactory to rely on the organic phosphorus determination, which runs somewhat higher than the "phytin" phosphorus. The organic phosphorus is given by the difference between total phosphorus, determined by the method of Fontaine, Ind. Eng. Chem., Anal. ed., 14, 77–8 (1942), and inorganic phosphorus, as obtained by the Pons method, Ind. Eng. Chem., Anal. ed., 18, 184–6 (1946). The same factor, 4.55, is suitably used for converting organic phosphorus to "phytin" content.

The various flours used in our experimental work, along with the analyses for protein and "phytin," are given in Table I. Flaxseed 1 represents the flour which was obtained from hexane extracted meal, while flaxseed 2 was similarly treated with acetone. It is of interest to note that stillingia flour had the highest protein content, while the various wild gourds were high in "phytin" phosphorus.

The amount of each fraction that was obtained from the various flours by the procedure of this invention is given in Table II. As might be expected from the protein analysis, the highest yield of protein was obtained from stillingia.

The various fractions were analyzed for nitrogen content, which figure was multiplied by 6.25 to give protein (see Table III). Low nitrogen was obtained on the "phytin" fraction indicating only minor amounts of protein present.

In Table IV, an indication is given of the "phytin" content of the various fractions. This was obtained from the analysis for organic phosphorus content, which figure was multiplied by a factor of 4.55. Since "phytin" is not a definite compound, the factor is arbitrary. It was obtained as an average of various reported phosphorus contents of "phytin" and as the result of analysis of commercial "phytins." The results on the "phytin" fraction analysis indicate a high concentration of this material.

As indicated above, the organic phosphorus is obtained as the difference between the total phosphorus and the inorganic phosphorus. This implies that all of the organic phosphorus is present as "phytin." It is known that this is not strictly true. "Phytin" phosphorus was run on the various "phytin" fractions and is compared to the organic phosphorus in Table V. As would be expected, the organic phosphorus runs slightly higher than the "phytin" phosphorus. However, since the "phytin" phosphorus analysis is difficult and is subject to numerous errors, the organic phosphorus determinations were used in the tabulations.

In order to be sure that the material considered as "phytin" was truly a salt of "phytic" acid and not some other organic phosphorus compound, such material was hydrolyzed, and inositol was prepared from it by the method described by Bartow and Walker, Ind. Eng. Chem. 30, 300–3 (1938). The oil seed inositols prepared by this procedure were tested with the results given in Table VI. Inositol was also prepared from a sample of commercial "phytin." For comparison, the data on a sample of commercial i-inositol from the Corn Products Refining Company are included. These results confirm the actual separation of "phytin."

The value of the process of this invention is particularly well demonstrated by the data of Tables III and IV. In general, Table III shows the high purity of the protein fractions, while Table IV shows the high concentration of "phytin" in the "phytin" fractions recoverable by the instant process.

In order to further illustrate the process of this invention, the following examples are given:

EXAMPLE I 4.5 pounds of protein flour from flaxseed were extracted twice with 67.5 pounds of water at a pH adjusted for each extraction to 4.7 with 5% hydrochloric acid. Each extraction was continued for 45 minutes and consisted of mixing the solids and the liquid in a stainless steel tank, which was followed by separation of the solids from the liquid by centrifuging. The combined extracts yielded 117 pounds of a solution of "phytin" and water-soluble seed constituents.

The pH of the solution of soluble seed constituents was adjusted from pH 4.7 to pH 7 with 5% sodium hydroxide solution, and the neutral solution was boiled for 1.5 hours. This boiling step effected coagulation and precipitation of the "phytin," which was recovered from the hot solution by centrifuging. The precipitated "phytin" was dried, yielding 0.2 pound of a product analyzing 13.1% phosphorus, or 66.4% "phytin."

For the recovery of the protein fraction, the residual solids from the extractions at pH 4.7 were extracted with sodium hydroxide in solution at pH 11. Two alkaline extractions were employed, the first using 135 pounds of water, the second using 67.5 pounds of water, there having been added in each case sufficient 5% sodium hydroxide to give the required pH. The centrifugates from the pH 11 extractions were then combined to give 205 pounds of a protein dispersion.

The pH of the protein dispersion was then adjusted to pH 4.7 with sulfurous acid so as to coagulate the protein. The protein was settled overnight; the supernatant liquid was then withdrawn; and the settled material was spray dried to produce 1.4 pounds of chemically purified protein analyzing 93.6% protein.

An additional amount of material was recovered by spray drying the solution of soluble seed constituents from which the "phytin" had been removed; this step yielded 1.5 pounds of water-soluble material analyzing 43.6% protein. The supernatant liquid from the protein coagulation step can suitably be combined with this water-soluble material to increase the yield of this fraction.

EXAMPLE II 3.5 pounds of protein flour from Chinese tallow tree seeds were twice extracted with 52.5 pounds of water at a pH adjusted for each extraction to 4.7 with 5% hydrochloric acid. Each extraction was continued for 45 minutes, and consisted of mixing the solids and liquid in a stainless steel tank, followed by separation of solids from the liquid by centrifuging. The extracts were combined to give 93.3 pounds of a solution of "phytin" and soluble seed constituents.

The pH of this solution was adjusted from pH 4.7 to pH 7 with 5% sodium hydroxide solution, and the neutral solution was boiled for about 2 hours. This boiling step effected precipitation of the "phytin," which was recovered from the solution by centrifuging. The precipitated "phytin" was dried, yielding 0.16 pound of a product analyzing 17.6% phosphorus or 89.0% "phytin."

For the recovery of the protein fraction, the residual solids from the extraction at pH 4.7 were extracted with sodium hydroxide solution at pH 11. Two alkaline extractions were employed, the first using 105 pounds of water, the second 52.5 pounds of water; in each case there was added sufficient 5% sodium hydroxide solution to give the required pH. These pH 11 extractions were carried out in a manner similar to the pH 4.7 extractions, and the pH 11 extracts were combined to give 157 pounds of a protein dispersion.

The pH of the protein dispersion was then adjusted from pH 11 to pH 4.7 with sulfurous acid so as to coagulate the protein. The coagulated protein was settled overnight, and the supernatant liquid was then withdrawn. The settled material was spray dried to produce 2.0 pounds of chemically purified protein analyzing 16.5% nitrogen.

The solution of soluble seed constituents from which the "phytin" had been removed was dried to produce 0.5 pound of water soluble material analyzing 32.6% protein. As in Example I, the supernatant liquid from the protein coagulation step can suitably be combined with this water soluble fraction.

EXAMPLE III 4.5 pounds of protein flour from *Cucurbita digitata* were extracted twice with 67.5 pounds of water at a pH adjusted for each extraction to 4.7 with 5% hydrochloric acid. Each extraction was continued for 45 minutes, and consisted of mixing the solids and liquid in a stainless steel tank, followed by separation of solids from the liquid by centrifuging. The extracts were combined to give 117 pounds of a solution of "phytin" and soluble seed constituents.

The pH of this solution was adjusted from pH 4.7 to pH 7 with 5% sodium hydroxide solution, and the neutral solution was boiled for about 2 hours. This boiling step effected precipitation of the "phytin," which was recovered from the hot solution by centrifuging. The precipitated "phytin" was dried, yielding 0.22 pound of a product analyzing 16.9% phosphorus or 85.5% "phytin."

For the recovery of the protein fraction, the residual solids from the extraction at pH 4.7 were extracted with sodium hydroxide solution at pH 11. Two alkaline extractions were employed, the first using 135 pounds of water, the second using 67.5 pounds of water, with the addition, in each case, of sufficient 5% sodium hydroxide solution to give the required pH. These pH 11 extractions were carried out as were the pH 4.7 extractions, and the pH 11 extracts were combined to give 205 pounds of a protein dispersion.

The pH of the protein dispersion was adjusted from pH 11 to pH 4.7 with sulfurous acid so as to coagulate the protein. The coagulated protein was settled overnight, and the supernatant liquid was then withdrawn. The settled material was spray dried to produce 1.9 pounds of chemically purified protein analyzing 95.3% protein.

The solution of soluble seed constituents from which the "phytin" had been removed was spray dried to produce 0.9 pound of water soluble material analyzing 23.9% protein.

EXAMPLE IV 4.5 pounds of protein flour from soybeans were extracted twice with 67.5 pounds of water at a pH adjusted for each extraction to 4.7 with 5% hydrochloric acid. Each extraction was continued for 45 minutes, and consisted of mixing the solids and liquid in a stainless steel tank, followed by separation of solids from the liquid by centrifuging. The extracts were combined to give 117 pounds of a solution of "phytin" and soluble seed constituents.

The pH of this solution was adjusted from pH 4.7 to pH 7 with 5% sodium hydroxide solution, and the neutral solution was boiled for 2 hours. This boiling step effected precipitation of the "phytin," which was recovered from the hot solution by centrifuging. The precipitated "phytin" was dried, yielding 0.05 pound of a product analyzing 15.9% phosphorus or 80.5% "phytin."

For the recovery of the protein fraction, the residual solids from the extractions at pH 4.7 were extracted with sodium hydroxide solution at pH 11. Two alkaline extractions were employed, the first using 135 pounds of water, the second using 67.5 pounds of water, with the addition, in each case, of sufficient 5% sodium hydroxide solution to give the required pH. These pH 11 extractions were carried out as were the pH 4.7 extractions, and the pH 11 extracts were combined to give 205 pounds of a protein dispersion.

The pH of the protein dispersion was adjusted from pH 11 to pH 4.7 with sulfurous acid so as to coagulate the protein. The coagulated protein was settled overnight, and the supernatant liquid was then withdrawn. The settled material was spray dried to produce 2.1 pounds of chemically purified protein analyzing 94.2% protein.

The solution of soluble seed constituents from which the "phytin" had been removed was spray dried to produce 1.0 pound of water-soluble material analyzing 12.7% protein.

In all of the above examples, it may be noted that the phosphorus obtained by analysis was organic phosphorus.

Obviously, many modifications and variations of the invention, as hereinbefore set forth, will be apparent to those skilled in the art and are within the spirit of the appended claims.

*Table I.—Analysis of flours*

| Flour | Percent N | Percent Protein | Percent Org. P | Percent "Phytin" |
|---|---|---|---|---|
| Flaxseed 1 | 8.9 | 56 | 1.4 | 6.4 |
| Flaxseed 2 | 8.1 | 51 | 1.3 | 5.9 |
| Stillingia | 11.3 | 71 | 1.4 | 6.4 |
| C. digitata | 10.7 | 67 | 1.8 | 8.4 |
| C. foetidissima | 10.7 | 67 | 1.7 | 7.7 |
| C. palmata | 10.6 | 66 | 2.0 | 9.1 |
| Peanut | 8.1 | 51 | 0.7 | 3.2 |
| Soybean | 8.9 | 56 | 0.8 | 3.6 |

*Table II.—Per cent fractions recovered*

| Flour | "Phytin" | Protein | Solubles | Residue |
|---|---|---|---|---|
| Flaxseed 1 | 6 | 34 | 38 | 22 |
| Flaxseed 2 | 5 | 36 | 36 | 22 |
| Stillingia | 6 | 57 | 23 | 14 |
| C. Digitata | 5 | 42 | 35 | 18 |
| C. foetidissima | 4 | 38 | 40 | 18 |
| C. palmata | 6 | 37 | 32 | 25 |
| Peanut | 2 | 43 | 30 | 25 |
| Soybean | 1 | 47 | 32 | 20 |

*Table III.—Per cent protein in fractions*

| Flour | "Phytin" | Protein | Solubles | Residue |
|---|---|---|---|---|
| Flaxseed 1 | 28 | 94 | 45 | 12 |
| Flaxseed 2 | 24 | 98 | 42 | 16 |
| Stillingia | 6 | 100 | 32 | 17 |
| C. digitata | 8 | 96 | 24 | 18 |
| C. foetidissima | 6 | 100 | 38 | 19 |
| C. Palmata | 8 | 96 | 36 | 25 |
| Peanut | 11 | 99 | 17 | |
| Soybean | 16 | 94 | 12 | 22 |

*Table IV.—Per cent "phytin" in fractions*

| Flour | "Phytin" | Protein | Solubles | Residue |
|---|---|---|---|---|
| Flaxseed 1 | 60 | 4 | 5 | 0 |
| Flaxseed 2 | 61 | 5 | 1 | 1 |
| Stillingia | 80 | 1 | 3 | 1 |
| C. digitata | 77 | 5 | 5 | 0 |
| C. foetidissima | 79 | 5 | 2 | 1 |
| C. palmata | 73 | 5 | 2 | 1 |
| Peanut | 76 | 4 | 1 | 0 |
| Soybean | 72 | 4 | 1 | 1 |

*Table V.—Comparison of "phytin" analysis*

| "Phytin" from— | Organic P | "Phytin" P |
|---|---|---|
| Flaxseed 1 | 13.1 | 13.1 |
| Flaxseed 2 | 13.4 | 10.3 |
| Stillingia | 17.6 | 15.4 |
| C. digitata | 16.9 | 16.5 |
| C. foetidissima | 17.3 | 15.2 |
| C. palmata | 16.1 | 15.7 |
| Peanut | 16.6 | 15.0 |
| Soybean | 15.9 | 12.9 |

*Table VI.—Inositol analysis*

| Inositol from | Melting Point | Hydroxyl Content |
|---|---|---|
| Flaxseed 1 | 226 | 55.4 |
| Flaxseed 2 | 224 | 55.7 |
| Stillingia | 224 | 56.1 |
| C. digitata | 224 | 53.2 |
| C. foetidissima | 226 | 53.7 |
| Peanut | 223 | 53.8 |
| "Phytin" (Commercial) | 226 | 56.8 |
| Inositol (Commercial) | 225 | 56.6 |

What is claimed is:

1. A method for producing "phytin" from the protein flour of an oil seed, which comprises leaching said flour with acidulated water at a pH of 4.5 to 4.9, adjusting the pH of the solution obtained in said leaching step to between 6.4 and 7.0 by the use of an alkali metal hydroxide, boiling the solution so as to coagulate and precipitate its "phytin" content, and separating the precipitated "phytin."

2. The method of claim 1, in which said protein flour is derived from flaxseed.

3. The method of claim 1, in which said protein flour is derived from soybeans.

4. The method of claim 1, in which said protein flour is derived from peanuts.

5. The method of claim 1, in which a water-soluble fraction is obtained by evaporation of the supernatant liquid recovered from the "phytin" coagulation step.

References Cited in the file of this patent

UNITED STATES PATENTS

| | | |
|---|---|---|
| 1,313,014 | Posternak | Aug. 12, 1919 |
| 1,321,480 | Satow | Nov. 11, 1919 |
| 2,260,640 | Rawling et al. | Oct. 28, 1941 |
| 2,460,627 | Erkko | Feb. 1, 1949 |
| 2,493,666 | Gehman | Jan. 3, 1950 |